US010292330B2

(12) United States Patent
Borry

(10) Patent No.: US 10,292,330 B2
(45) Date of Patent: May 21, 2019

(54) AGRICULTURAL HARVESTER GRAIN HEADER AUGER

(71) Applicant: CNH Industrial America LLC, New Holland, PA (US)

(72) Inventor: Stijn Borry, Pittem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/535,336

(22) PCT Filed: Dec. 11, 2015

(86) PCT No.: PCT/EP2015/079373
§ 371 (c)(1),
(2) Date: Jun. 12, 2017

(87) PCT Pub. No.: WO2016/092061
PCT Pub. Date: Jun. 16, 2016

(65) Prior Publication Data
US 2017/0318745 A1    Nov. 9, 2017

(30) Foreign Application Priority Data
Dec. 12, 2014    (BE) .................................. 2014/0837

(51) Int. Cl.
A01D 61/00    (2006.01)
A01D 41/14    (2006.01)
A01D 34/04    (2006.01)

(52) U.S. Cl.
CPC .......... *A01D 61/004* (2013.01); *A01D 41/14* (2013.01); *A01D 34/04* (2013.01)

(58) Field of Classification Search
CPC ...... A01D 41/14; A01D 41/144; A01D 45/00; A01D 61/004; A01D 61/002; A01D 34/04; A01B 73/02
See application file for complete search history.

(56) References Cited

U.S. PATENT DOCUMENTS 3,345,808 A * 10/1967 Van Der Lely ...... A01D 34/246
56/10.2 R
3,540,195 A * 11/1970 Van Der Lely ........ A01D 57/30
56/10.7
(Continued)

FOREIGN PATENT DOCUMENTS

CN    203158726 U *  8/2013    ............. B65G 33/32
DE    202006019070 U1 *  5/2007    ........... A01B 73/065
(Continued)

*Primary Examiner* — Arpad Fabian-Kovacs
(74) *Attorney, Agent, or Firm* — Peter K. Zacharias; Patrick M. Sheldrake

(57) ABSTRACT

An agricultural harvester includes a chassis, a header for cutting and gathering crop material, the header being carried by the chassis, and an auger. The auger moves the cut crop material toward a central area of the header. The auger is rotatably carried by the header. The auger has a plurality of auger sections. The auger includes an auger crankshaft and a hingeable coupling for coupling two of the auger sections to each other. The hingeable coupling allows the auger sections to rotate about differing axes. The hingeable coupling has an internal opening. The auger crankshaft provides positional timing to auger fingers. The auger crankshaft passing through the internal opening.

20 Claims, 5 Drawing Sheets

(56) References Cited

U.S. PATENT DOCUMENTS

| | | | | |
|---|---|---|---|---|
| 4,271,956 A | * | 6/1981 | Hutchinson | B65G 65/22 198/613 |
| 4,409,780 A | * | 10/1983 | Beougher | A01B 73/02 172/456 |
| 4,487,004 A | * | 12/1984 | Kejr | A01D 41/14 56/14.4 |
| 5,067,264 A | * | 11/1991 | Beeley | A01B 33/087 172/112 |
| 5,632,106 A | * | 5/1997 | Sinykin | E01H 4/02 172/250 |
| 5,673,543 A | * | 10/1997 | Richardson | A01D 41/144 56/228 |
| 5,724,798 A | * | 3/1998 | Stefl | A01D 41/144 172/311 |
| 5,768,868 A | * | 6/1998 | Stein | A01D 41/142 56/14.5 |
| 8,635,842 B2 | * | 1/2014 | Markt | A01D 41/14 56/15.2 |
| 2008/0295474 A1 | | 12/2008 | Tippery et al. | |
| 2010/0212277 A1 | | 8/2010 | Marrs | |
| 2014/0066149 A1 | * | 3/2014 | Dise | A01F 12/46 460/114 |
| 2014/0075906 A1 | | 3/2014 | Heim et al. | |
| 2014/0075907 A1 | * | 3/2014 | Ritter | A01D 45/021 56/105 |
| 2014/0075909 A1 | * | 3/2014 | Bomleny | A01D 41/144 56/119 |
| 2014/0283493 A1 | | 9/2014 | Barnett et al. | |

FOREIGN PATENT DOCUMENTS

| | | | | |
|---|---|---|---|---|
| DE | 102007033952 A | * | 6/2008 | A01B 73/065 |
| EP | 2710879 A2 | | 3/2014 | |
| JP | 10115170 A | * | 5/1998 | E21B 17/02 |
| RU | 2342303 C1 | * | 12/2008 | B65G 33/24 |

* cited by examiner

AGRICULTURAL HARVESTER GRAIN HEADER AUGER

CROSS REFERENCE TO RELATED APPLICATION

This application is the National Stage of International Application No. PCT/EP2015/079373 filed Dec. 11, 2015, which claims priority to Belgian Application No. 2014/0837 filed Dec. 12, 2014, the contents of which are incorporated herein by reference.

BACKGROUND OF THE INVENTION

The present invention relates to agricultural harvesters, and, more specifically to augers in grain headers of harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

The crop gathering capability of the combine is directly dependent upon the width of the header, since the width defines that amount of crop that the combine encounters as the combine moves forward across a field. Ground contours vary which can lead to some crops being lower than the cutter bar and hence lost grain.

What is needed in the art is a cost effective and efficient way of allowing the components, particularly the auger in the header to operate while the header profile changes to more effectively harvest the crop across the field.

SUMMARY OF THE INVENTION

The present invention provides for the transfer of power through a hinged auger.

The invention in one form is directed to an agricultural harvester including a chassis, a header for cutting and gathering crop material, the header being carried by the chassis, and an auger. The auger moves the cut crop material toward a central area of the header. The auger is rotatably carried by the header. The auger has a plurality of auger sections. The auger includes an auger crankshaft and a hingeable coupling for coupling two of the auger sections to each other. The hingeable coupling allows the auger sections to rotate about differing axes. The hingeable coupling has an internal opening. The auger crankshaft provides positional timing to auger fingers. The auger crankshaft passing through the internal opening.

An advantage of the present invention is that the positioning of auger fingers is controlled by the crankshaft positioning while rotational power is transferable through the hinged coupling of the auger in the header.

Another advantage is that the hinged coupling allows for the effective use of ground contour following headers in wide headers.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
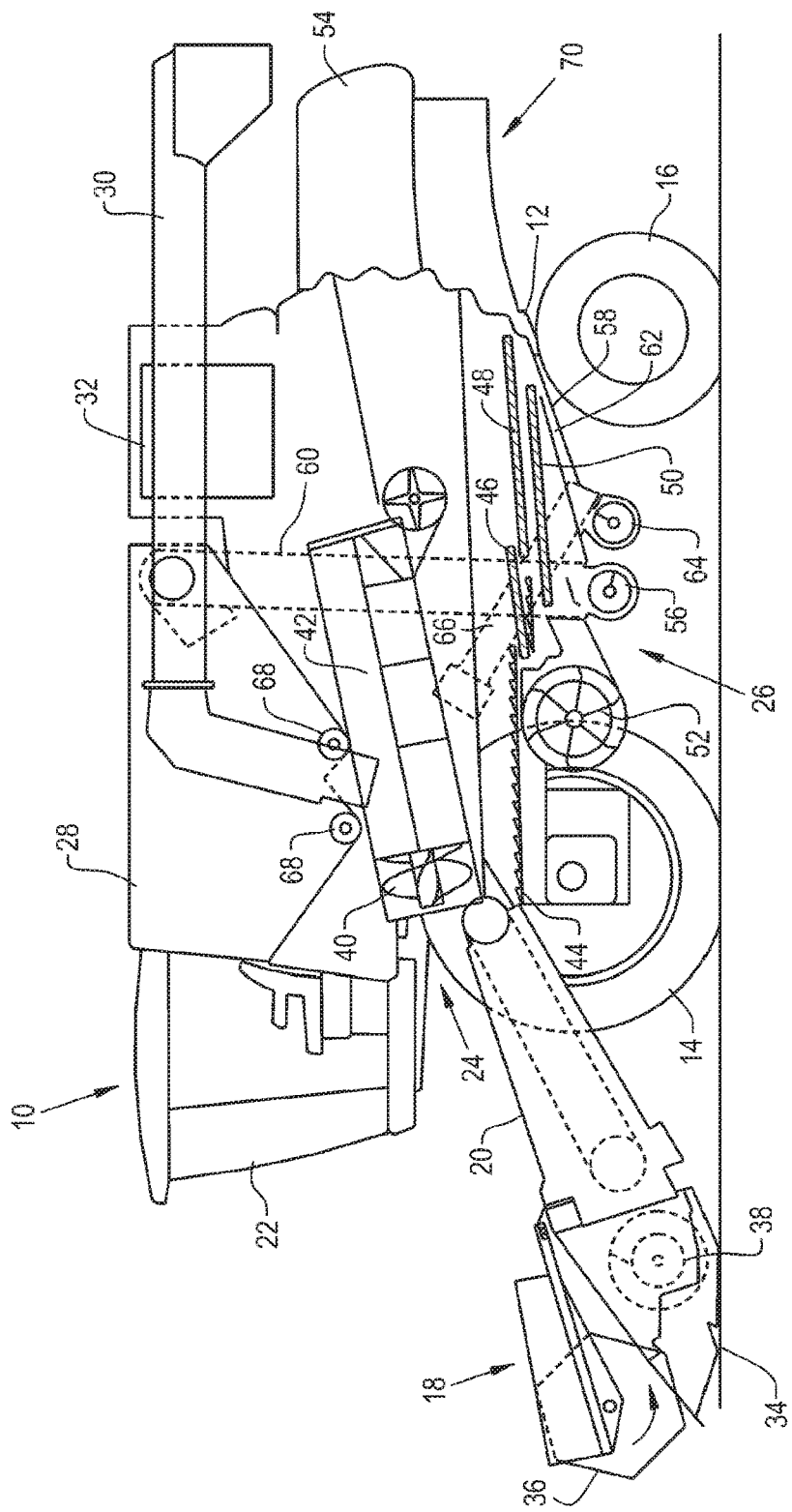
FIG. 1 is a side view of an embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present invention with other conventional threshing systems.

Grain which has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
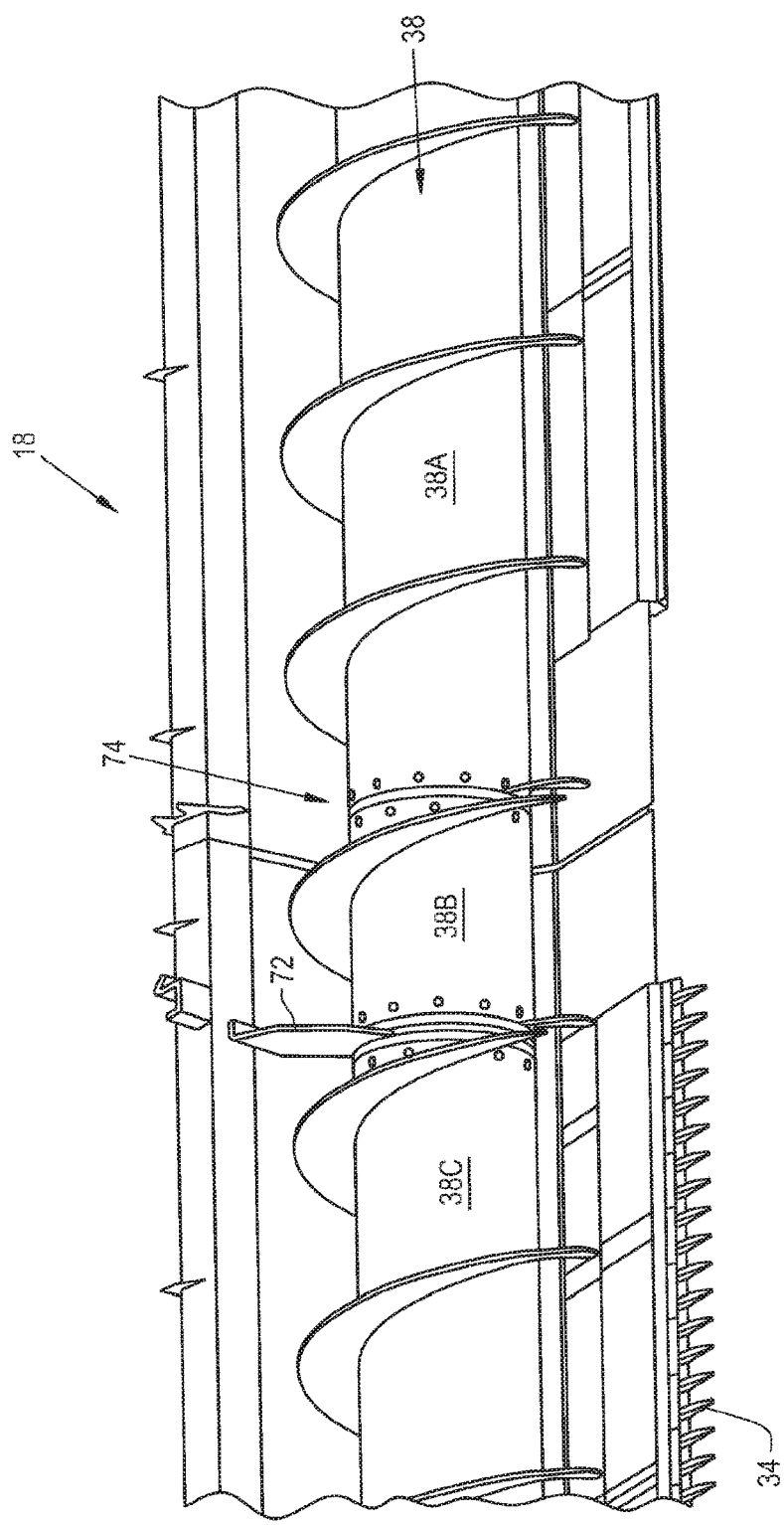
FIG. 2 is a perspective view of the header of the harvester of FIG. 1 with an embodiment of a hingeable coupled auger of the present invention.

Now, additionally referring to FIG. 2 there is shown and illustrated the header 18 with a portion of the auger 38 shown and with some elements omitted for the sake of clarity. The auger 38 has three sections shown, denoted here as 38A, 38B and 38C, which is representative of other sections in the auger 38. Sections 38C and 38B are rotatably coupled together with a hanger support 72. The hanger support 72 is fixed to the header 18 and provides support to the auger 38 so that the auger 38 can rotate suspended above the lower structure of the header 18.

Auger sections 38A and 38B are coupled together by way of a flexible coupling 74, also known as a hingeable coupling 74, which allows the auger section 38A to rotate about an axis that can angularly vary from an axis about which auger sections 38B and 38C rotate. As shown auger sections 38B and 38C are coupled so that they rotate about the same axis. The hingeable coupling 74 allows for the flexure of the auger 38, which may proximally correspond to the location of hinged portions of the header 18. This is particularly advantageous when the header 18 is long, say over 40 feet in width.

Figure 3:
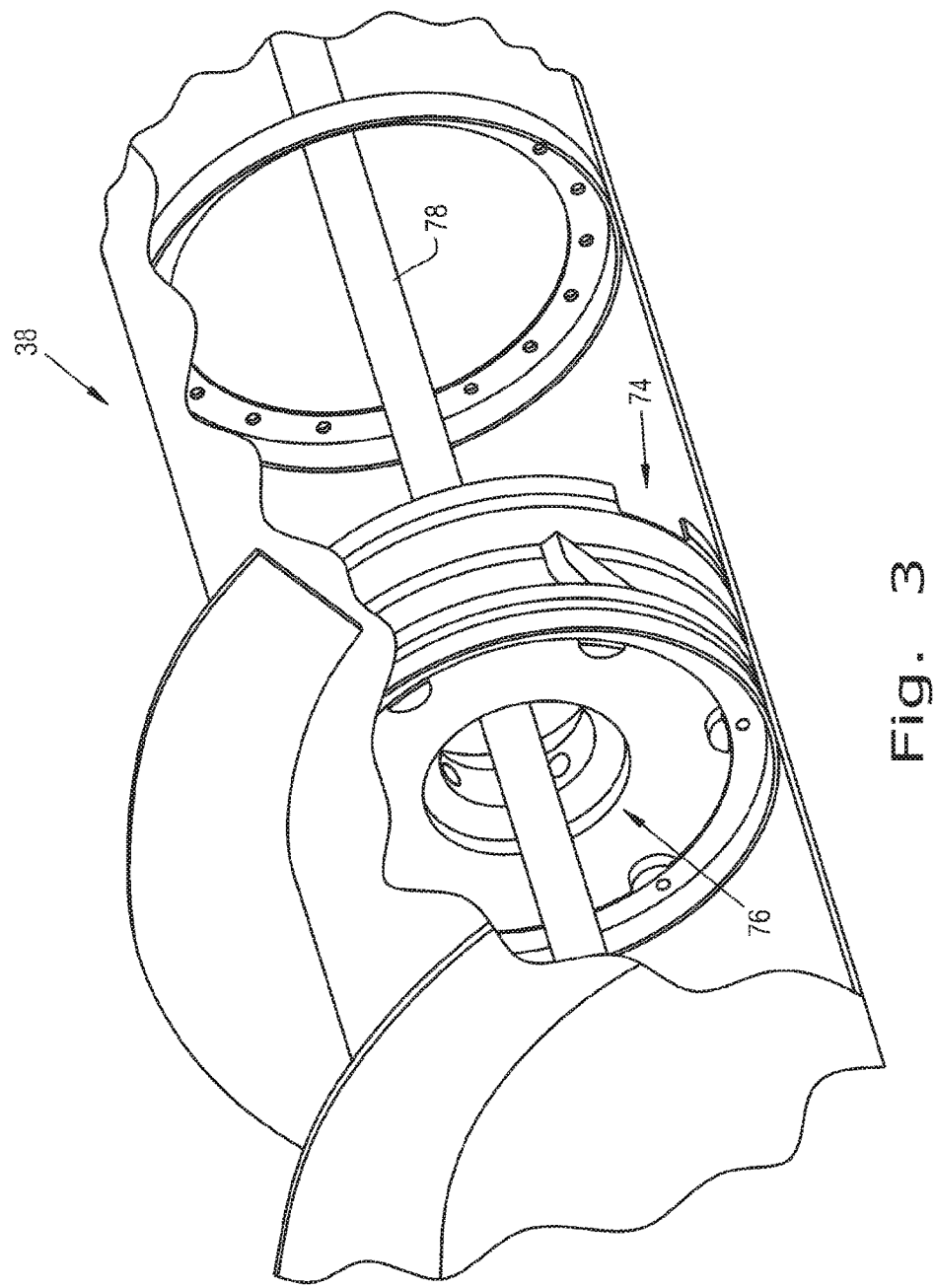
FIG. 3 is a cutaway view of the hingeable coupling in the auger of FIG. 2.

Now, additionally referring to FIG. 3, there is shown a view of the hingeable coupling 74, and an aspect of the present invention, having an opening 76 that exists through the various components of the hingeable coupling 74, as discussed later. An auger crankshaft 78 passes through the opening 76 and does not touch the hingeable coupling 74. The auger crankshaft 78 provides rotational movement to effect the timing of auger fingers that extend through sections of the auger 38, and may additionally provide movement to other mechanisms (not shown). The auger crankshaft 78 has a separate hingeable coupling 80 (illustrated in FIG. 6), which is spaced apart from the hingeable coupling 74 of the auger 38, as shown. It is also contemplated that the hingeable coupling 80 and the hingeable coupling 74 may be collocational, or generally close to each other.

Figure 4:
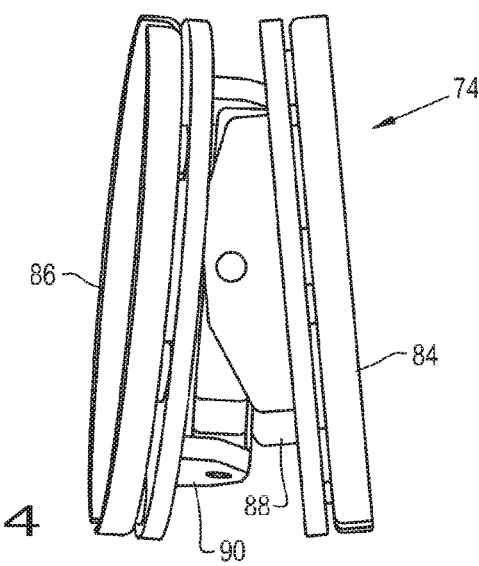
FIG. 4 is a perspective view of the hingeable coupling of FIGS. 2 and 3.
Figure 5:
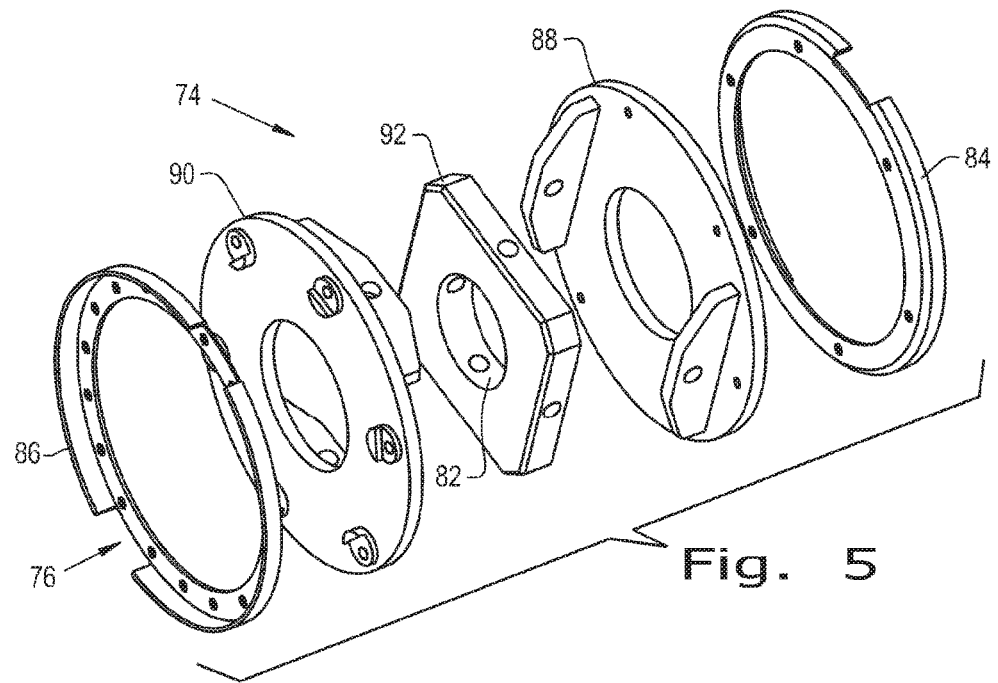
FIG. 5 is an exploded view of the hingeable coupling of FIGS. 2-4.

Now, additionally referring to FIGS. 4 and 5 there are shown more aspects of the hingeable coupling 74 of the present invention. The opening 76 is shown as having different sizes in the various components, and it is also contemplated that the opening sizes may all be the same. Openings 76 have edges 82, which are not touched by the auger crankshaft 78 as the auger 38 hinges about the hingeable coupling 74. The hingeable coupling 74 includes auger couplings 84 and 86, winged couplings 88 and 90 and an inner coupling 92. The auger couplings 84 and 86 are respectively coupled to the auger sections 38A and 38B. Winged couplings 88 and 90 are respectively coupled to the auger couplings 84 and 86, and are both pivotally coupled to the inner coupling 92. The pivotal couplings are substantially perpendicular to each other, to thereby allow the auger section 38A to hinge relative to the auger section 38B.

Figure 6:
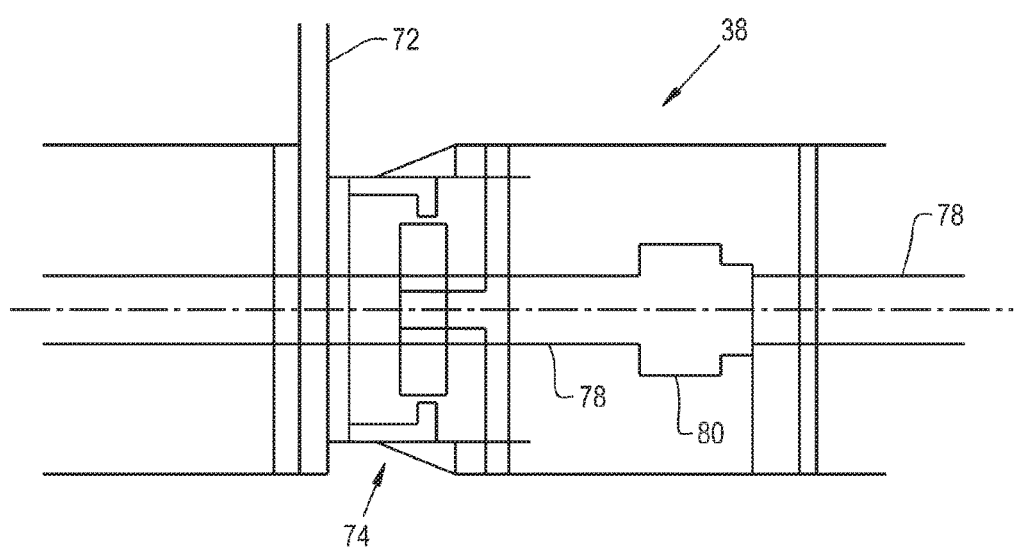
FIG. 6 is a cutaway view of another embodiment of a hingeable coupling of the present invention used in the auger of FIGS. 1-3.

According to another aspect of the present invention, the auger crankshaft 78 can also have a hingeable coupling 80, as illustrated in FIG. 6. The positioning of the hingeable coupling 74 may be proximate to the hanger support 72 and one portion of the hingeable coupling 74 may be rotationally coupled to the hanger support 72. It is contemplated that the positioning of the hingeable coupling 80 may be close, or even collocational, to the hingeable coupling 74, as shown in FIG. 6 and the opening 76 is sized so that the edges 82 are not touched by the crankshaft 78 even though couplings 74 and 80 are not in contact and hinge at different points along the longitudinal axis of the auger 38 as the hingeable coupling 74 is fully flexed. The hingeable coupling 74 is entirely interior to the auger 38.

The present invention couples at least some of the adjacent sections of the auger 38 together allowing a hinging of the auger 38 over the length of the header 18 to thereby allow for extended lengths of the auger 38 to operate as the header 18 is articulated or allowed to flex over non-planar ground. One aspect of the present invention that allows the hinged coupling 74 to work is the passing of the auger crankshaft 78 through the coupling to thereby allow for a positioning of the auger fingers as the auger 38 rotates. Auger crankshaft 78 can be rotated to alter the timing of the auger fingers along the length of the auger 38. The improvement allows for closer ground contour following of the header 18 and the corresponding improved gathering capability of the header 18.

Advantageously, varifeed headers can be made to extended lengths, such as greater than 41 feet using the present invention. The present invention uses a large cross coupling 74 so that the auger tube 38 can flex. Yet there is a large opening 76 in the middle of the coupling 74 to allow the auger crankshaft 78 to pass therethrough, all to allow the auger 38 the ability to flex a few degrees. The flexing or hinging allows for the transfer of auger torque and the timing of the auger fingers to be preserved.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvester, comprising:
   a chassis;
   a header for cutting and gathering crop material, the header configured for attachment to the chassis; and
   an auger for moving the cut crop material, the auger being rotatably carried by the header, the auger having a plurality of auger sections;
   wherein the auger comprises:
   a hingeable coupling for coupling two of the auger sections to each other, the hingeable coupling allowing the auger sections to rotate about differing axes, the hingeable coupling having an internal opening; and
   an auger crankshaft for providing positional timing to auger fingers, the auger crankshaft passing through the internal opening of the hingeable coupling, the auger crankshaft not contacting the hingeable coupling.

2. The agricultural harvester of claim 1, further comprising a hanger support affixed to the header, the hanger support configured to support and rotatably couple the auger to the header allowing the auger to rotate relative to the hanger support.

3. The agricultural harvester of claim 2, wherein the hingeable coupling is not directly coupled to the hanger support.

4. The agricultural harvester of claim 2, wherein the hingeable coupling is directly coupled to the hanger support.

5. The agricultural harvester of claim 1, wherein the auger crankshaft comprises a hingeable coupling.

6. The agricultural harvester of claim 5, wherein the hingeable coupling of the auger crankshaft is not collocated with the hingeable coupling of the auger sections.

7. The agricultural harvester of claim 5, wherein the hingeable coupling of the auger crankshaft is located proximate to the hingeable coupling of the auger sections.

8. The agricultural harvester of claim 1, wherein the opening has edges, the auger crankshaft does not contact the edges even when the hingeable coupling is fully flexed.

9. The agricultural harvester of claim 1, wherein the auger crankshaft is not drivingly coupled to the auger.

10. The agricultural harvester of claim 1, wherein the hingeable coupling is interior to the auger.

11. The agricultural harvester of claim 1, further comprising a plurality of hingeable couplings for coupling adjacent sections of the auger together along a longitudinal length of the auger.

12. An auger assembly for use on an agricultural harvester having a header, the auger assembly comprising:
   an auger rotatably carried by the header, the auger having a plurality of auger sections;
   a hingeable coupling for coupling two of the auger sections to each other, the hingeable coupling having an internal opening; and
   an auger crankshaft passing through the internal opening, the auger crankshaft not contacting the hingeable coupling.

13. The auger assembly of claim 12, further comprising a hanger support affixed to the header, the hanger support being rotatably coupled to the auger.

14. The auger assembly of claim 13, wherein the hingeable coupling is not directly coupled to the hanger support.

15. The auger assembly of claim 13, wherein the hingeable coupling is directly coupled to the hanger support.

16. The auger assembly of claim 12, wherein the auger crankshaft includes a hingeable coupling.

17. The auger assembly of claim 16, wherein the hingeable coupling of the auger crankshaft is not collocated with the hingeable coupling of the auger.

18. The auger assembly of claim 16, wherein the hingeable coupling of the auger crankshaft is located proximate to the hingeable coupling of the auger sections.

19. The auger assembly of claim 12, wherein the opening has edges, the auger crankshaft not touching the edges even when the hingeable coupling is fully flexed.

20. The auger assembly of claim 12, wherein the hingeable coupling is interior to the auger, the hingeable coupling allowing the auger sections to rotate about differing axes.

* * * * *